United States Patent
Jayaraman et al.

(10) Patent No.: US 7,301,990 B2
(45) Date of Patent: Nov. 27, 2007

(54) EQUALIZATION OF MULTIPLE SIGNALS RECEIVED FOR SOFT HANDOFF IN WIRELESS COMMUNICATION SYSTEMS

(75) Inventors: Srikant Jayaraman, San Diego, CA (US); John Smee, San Diego, CA (US); Ivan Jesus Fernandez-Corbaton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 10/371,795

(22) Filed: Feb. 21, 2003

(65) Prior Publication Data
US 2004/0165653 A1    Aug. 26, 2004

(51) Int. Cl.
H04B 1/00    (2006.01)

(52) U.S. Cl. .................................. 375/148; 375/229

(58) Field of Classification Search ............ 375/147–8, 375/229–30, 232, 347, 349–50, 148
See application file for complete search history.

(56) References Cited

U.S. PATENT DOCUMENTS

| 6,175,588 B1 * | 1/2001 | Visotsky et al. ............ 375/148 |
| 6,680,967 B1 * | 1/2004 | Westman ..................... 375/148 |
| 2003/0142739 A1 * | 7/2003 | Shiozawa .................... 375/229 |
| 2004/0101074 A1 * | 5/2004 | Wilson ........................ 375/550 |
| 2004/0165653 A1 * | 8/2004 | Jayaraman et al. ......... 375/148 |

FOREIGN PATENT DOCUMENTS

| WO |   02/09305   | 1/2002 |
| WO | WO 02/09305 | * 1/2002 |

* cited by examiner

*Primary Examiner*—David C. Payne
*Assistant Examiner*—Aslan Ettehadieh
(74) *Attorney, Agent, or Firm*—Albert J. Harnois, Jr.; Jonathan T. Velasco; Thomas R. Rouse

(57) ABSTRACT

Techniques for performing equalization of multiple signals received by a terminal in soft handoff with multiple base stations. The received signal at the terminal is conditioned and digitized to provide a stream of received samples, which is then equalized/filtered with multiple sets of coefficients to provide multiple streams of transmit chip estimates. One set of coefficients is provided for each base station and is used to provide a corresponding stream of transmit chip estimates. The multiple streams of transmit chip estimates are further processed to provide multiple streams of data symbol estimates, one stream of data symbol estimates for each base station. The multiple streams of data symbol estimates are then scaled with multiple scaling factors and combined to provide a stream of combined data symbol estimates. The processing for the multiple base stations may be performed by a single hardware unit in a time division multiplexed manner.

34 Claims, 7 Drawing Sheets

EQUALIZATION OF MULTIPLE SIGNALS RECEIVED FOR SOFT HANDOFF IN WIRELESS COMMUNICATION SYSTEMS

BACKGROUND

1. Field

The present invention relates generally to data communication, and more specifically to techniques for performing equalization of multiple signals received for soft handoff in wireless communication systems.

2. Background

Wireless communication systems are widely deployed to provide various types of communication such as voice, packet data, and so on. These systems may be multiple-access systems capable of supporting communication with multiple users and may be based on code division multiple access (CDMA), time division multiple access (TDMA), frequency division multiple access (FDMA), or some other multiple access technique. These systems may also be wireless local area network (LAN) systems, such as those that implement the 802.11b IEEE standard.

A wireless terminal in a CDMA system may receive data transmission from one or more base stations on the forward link. If the terminal is in soft handoff, then the same data stream may be transmitted to the terminal by multiple base stations to provide diversity against deleterious path effects and improve reliability. The signal transmitted by each base station may reach the terminal via one or more propagation paths. The received signal at the terminal may thus include one or more signal instances (or multipath components) of the signal transmitted by each base station.

A terminal in a CDMA system typically employs a rake receiver to process the received signal. The rake receiver normally includes one or more searcher elements and a number of demodulation elements, which are commonly referred to as "searcher" and "fingers", respectively. Due to the relatively wide bandwidth of a CDMA waveform, the communication channel may be assumed to be composed of a finite number of resolvable multipath components. Each multipath component may be characterized by a particular time delay and a particular complex gain. The searcher then searches for strong multipath components in the received signal, and fingers are assigned to the strongest multipath components found by the searcher. Each finger processes its assigned multipath component to provide symbol estimates for that multipath component. The symbol estimates from all assigned fingers are then combined to provide combined symbol estimates for the data stream to be recovered.

The rake receiver can provide acceptable performance for a CDMA system operated at a low signal-to-noise-and-interference ratio (SINR). The rake receiver can combine energy from a number of multipath components received by the terminal for one or multiple signals transmitted by one or multiple base stations. However, the rake receiver generally does not remove the effects of inter-symbol interference (ISI) that results from multipath effects and other distortions in the wireless channel. This ISI is typically negligible at low SINRs but can become a non-negligible noise component at higher SINRs. The ISI may limit the SINR that may be achieved by the terminal and may thus have a large impact on performance.

There is therefore a need in the art for techniques to process a received signal while in soft handoff to provide combined symbol estimates having higher SINR.

SUMMARY

Techniques are provided herein for performing equalization of multiple signals received by a terminal that is in soft handoff with multiple base stations. The received signal at the terminal is conditioned and digitized to provide a stream of received samples. This sample stream includes multiple transmissions of a common data symbol stream sent by the multiple base stations to the terminal. The stream of received samples is equalized or filtered with multiple sets of coefficients to provide multiple streams of transmit chip estimates. One set of coefficients is provided for each base station transmitting data to the terminal and is used to provide a corresponding stream of transmit chip estimates. The multiple streams of transmit chip estimates are further processed (e.g., despread and channelized) to provide multiple streams of data symbol estimates, one stream of data symbol estimates for each of the multiple base stations. The multiple streams of data symbol estimates may then be scaled with multiple scaling factors and combined to provide a stream of combined data symbol estimates. The processing for the multiple base stations may be performed by a single hardware unit that can implement multiple "virtual parallel equalizers" to provide the multiple streams of transmit chip estimates for these base stations.

The set of coefficients for each base station transmitting data to the terminal may be trained or adapted based on the transmit chip estimates, the data symbol estimates, or pilot symbol estimates derived for that base station. The multiple scaling factors for the multiple base stations may be selected based on a particular criterion, e.g., such that the SINR of the combined data symbol estimates is maximized. The coefficients and scaling factors may be determined based on various adaptation algorithms such as the least mean square (LMS) and the recursive least squares (RLS) algorithms.

Various aspects and embodiments of the invention are described in further detail below.

BRIEF DESCRIPTION OF THE DRAWINGS

The features, natures and advantages of the present invention will become more apparent from the detailed description set forth below when taken in conjunction with the drawings in which like reference characters identify corresponding elements or steps throughout and wherein.

DETAILED DESCRIPTION

Figure 1:
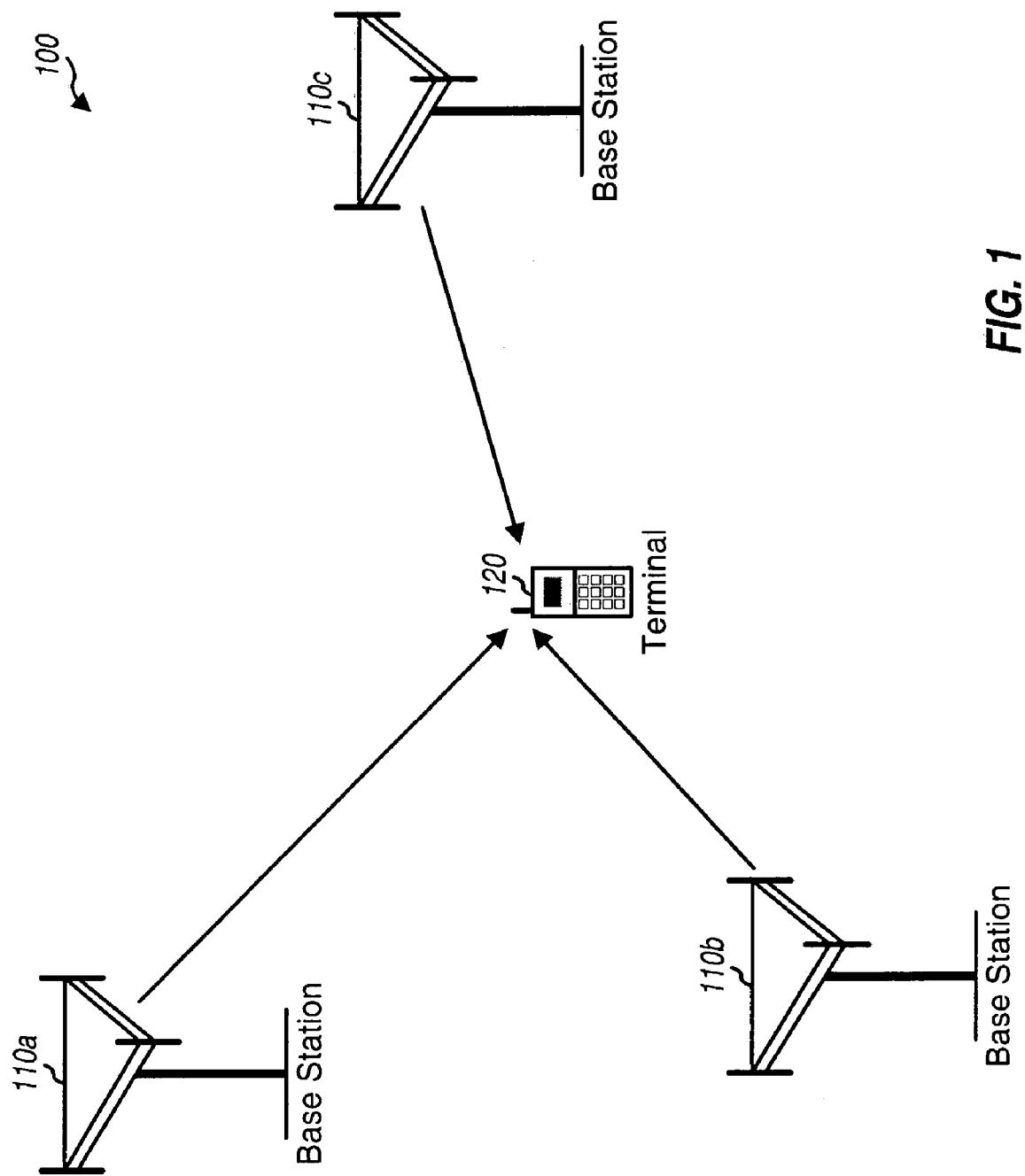
FIG. 1 shows a wireless communication system.

FIG. 1 shows a wireless communication system 100 that includes a number of base stations communicating with a number of terminals. For simplicity, only three base stations 110a, 110b, and 110c and one terminal 120 are shown in FIG. 1. A base station is a fixed station used for communicating with the terminals and may also be referred to as a base transceiver system (BTS), an access point, a Node B, or some other terminology. A terminal may also be referred to as a mobile station, a remote station, an access terminal, a user equipment (UE), or some other terminology.

A terminal may communicate with one or multiple base stations on the forward link (downlink) and/or reverse link (uplink) at any given moment. This depends on whether or not the terminal is active and whether or not the terminal is in soft handoff. In FIG. 1, terminal 120 is in soft handoff and receives duplicate data transmission on the forward link from all three base stations 110a, 110b, and 110c.

The techniques described herein for equalizing multiple signals received by a terminal in soft handoff may be implemented in various wireless communication systems. System 100 may thus be a CDMA, TDMA, or FDMA system or some other type of system. A CDMA system may be designed to implement one or more standards such as IS-95, IS-2000, IS-856, W-CDMA, and so on. A TDMA system may be designed to implement one or more standards such as Global System for Mobile Communications (GSM). These standards are well known in the art. For clarity, these techniques are described for a CDMA system that implements IS-95 and/or IS-2000.

Also for clarity, in the following analysis, the subscript "n" is used for pilot and data symbol index, the subscript "k" is used for a chip index, and the subscript "m" is used for a sample index. All of these indices are described below. Continuous time signals and responses are expressed using "t", such as h(t) and h(t−kT).

Figure 2:
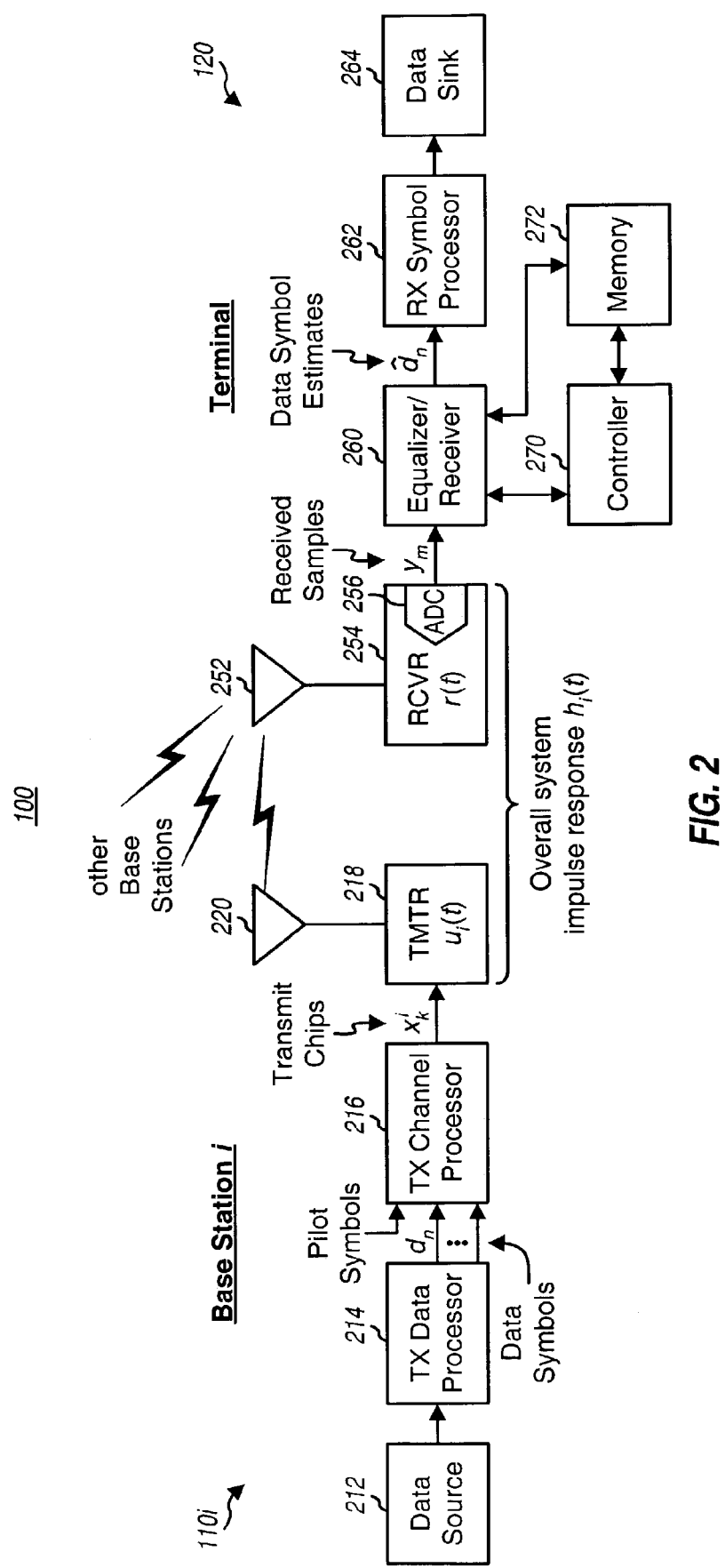
FIG. 2 shows a block diagram of a base station and a terminal.

FIG. 2 shows a block diagram of a base station 110i (which is one of the base stations shown in FIG. 1) and terminal 120. On the forward link, at base station 101i, data to be transmitted on the forward link to the terminals and for overhead channels is provided from a data source 212 to a transmit (TX) data processor 214. TX data processor 214 formats, codes, interleaves, and modulates the data for each terminal and each overhead channel to provide data modulation symbols (or simply, data symbols) for that terminal/channel. A TX channel processor 216 then receives and channelizes the data symbols and pilot symbols onto different code channels. TX channel processor 216 further combines and spectrally spreads the channelized data and pilot symbols with a complex pseudo-random number (PN) sequence assigned to base station 110i to provide a stream of transmit chips (denoted as $\{x_k^i\}$). The processing by processors 214 and 216 is described in further detail below. A transmitter unit (TMTR) 218 then converts the stream of transmit chips into one or more analog signals, and further conditions (e.g., amplifies, filters, and frequency upconverts) the analog signals to generate a modulated signal. The modulated signal is then transmitted via an antenna 220 and over a wireless channel.

Terminal 120 receives data transmission from multiple base stations when in soft handoff. The transmitted modulated signals from these base stations are received by an antenna 252, and the received signal from antenna 252 includes components of these modulated signals. A receiver unit (RCVR) 254 then conditions (e.g., amplifies, filters, and frequency downconverts) the received signal, and an analog-to-digital converter (ADC) 256 within receiver unit 254 digitizes the conditioned signal to provide ADC samples. The ADC samples may be digitally pre-processed (e.g., filtered, interpolated, sample rate converted, and so on) within receiver unit 254. Receiver unit 254 provides a stream of received samples (denoted as $\{y_m\}$), which may be the ADC samples or the pre-processed samples.

An equalizer/receiver 260 then processes the received samples to provide estimates of the data symbols transmitted to terminal 120, as described below. A receive (RX) symbol processor 262 further processes the data symbol estimates (denoted as $\{\hat{d}_n\}$) to provide decoded data, which is then provided to a data sink 264. A controller 270 directs the operation at terminal 120. A memory unit 272 provides storage for program codes and data used by controller 270 and other processing units within the terminal.

Figure 3:
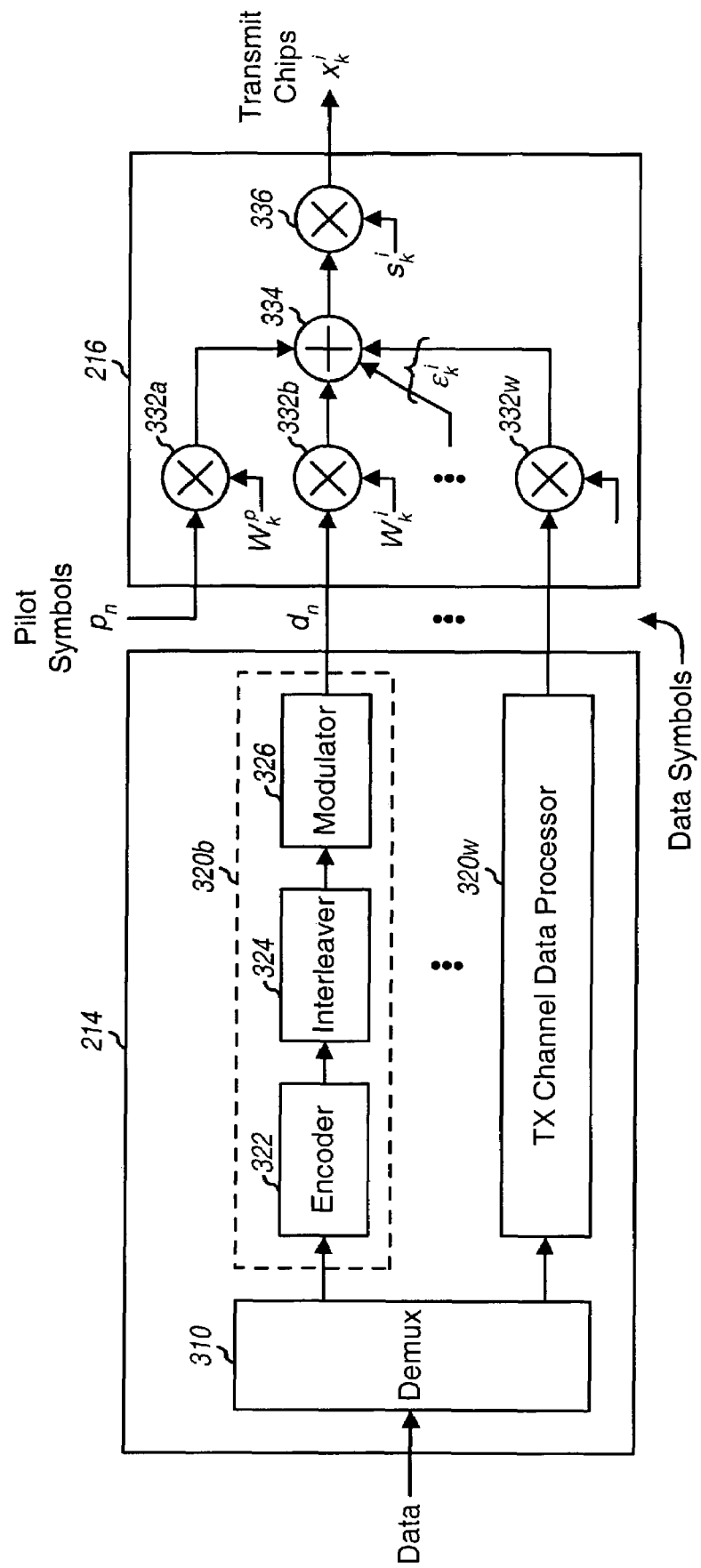
FIG. 3 shows a block diagram of a TX data processor and a TX channel processor within the base station.

FIG. 3 shows a block diagram of TX data processor 214 and TX channel processor 216 within base station 110i. Within TX data processor 214, the traffic data to be transmitted on the forward link is demultiplexed by a demultiplexer (Demux) 310 into multiple data streams, one of which is for terminal 120. Each data stream is provided to a respective TX channel data processor 320 and coded by an encoder 322, interleaved by an interleaver 324, and modulated (i.e., mapped to symbols) based on a particular modulation scheme (e.g., BPSK, QSPK, M-PSK, or M-QAM) to provide data symbols for that data stream. Each data symbol corresponds to a specific point on a signal constellation corresponding to the modulation scheme used for that data symbol. The stream of data symbols for terminal 120 is denoted as $\{d_n\}$.

Any number of data streams may be concurrently transmitted depending on various factors such as, for example, the number of active terminals, the number of available code channels, the available transmit power, and so on. One of the code channels is typically used for pilot transmission and the remaining code channels may be used for data transmission. Since the pilot is typically a known sequence of modulation symbols, a TX channel data processor is normally not needed for the pilot. TX channel data processor 320b through 320w are used for processing the data streams.

Within TX channel processor 216, the data symbol stream $\{d_n\}$ for terminal 120 is provided to a multiplier 332b and multiplied with an orthogonal sequence for the code channel used for terminal 120. This orthogonal sequence, which is a Walsh sequence in IS-95 and IS-2000 and an orthogonal variable spreading factor (OVSF) sequence in W-CDMA, is denoted as $\{W_k^i\}$. The channelization of the data symbol stream $\{d_n\}$ is achieved by multiplying each data symbol $d_n$ with the entire orthogonal sequence $\{W_k^i\}$. The data symbol rate is thus $1/N_w$ the rate of the orthogonal sequence $\{W_k^i\}$, where $N_w$ is the length of the orthogonal sequence. The data symbol streams for other terminals and for the overhead channels are similarly channelized by other multipliers 332 with other orthogonal sequences for their assigned code channels. The channelized data symbols for these other terminals and the overhead channels are collectively denoted as $\{\epsilon_k^i\}$.

TX channel processor 216 also receives pilot symbols $\{p_n\}$, which are typically known modulation symbols that may be used by the terminals to estimate the wireless channel response. In general, the pilot symbols may be multiplexed with the data symbols using time division multiplexing (TDM) or code division multiplexing (CDM). For the forward link in IS-95 and cdma2000 systems, the pilot symbols are multiplexed with the data symbols using CDM. The pilot symbols are thus channelized by a multiplier 332a with the orthogonal sequence $\{W_k^p\}$ for the pilot code channel (or simply, the pilot channel). The pilot symbol rate is dependent on the length of the orthogonal sequence $\{W_k^p\}$ and may be the same or different from the data symbol rate.

For simplicity, the pilot symbol rate is assumed to be the same as the data symbol rate, and the symbol index n is also used for the pilot symbols. Also for simplicity, each data symbol $d_n$ may be viewed as comprising a sequence of $N_w$ data symbols $\{d_k\}$ having the same value as $d_n$, and each pilot symbol $p_n$ may be viewed as comprising a sequence of $N_w$ pilot symbols $\{P_k\}$ having the same value as $p_n$.

The channelized pilot and data symbols are then combined by a summer 334 and further spectrally spread with the complex PN sequence for base station i (denoted as $\{s_k^i\}$) to provide the stream of transmit chips $\{x_k^i\}$ at the chip rate of $1/T_c$, where $T_c$ is the duration of one PN chip.

For IS-95 and IS-2000, the same complex PN sequence $\{s_k\}$ is used by all base stations in the system to spectrally spread their data prior to transmission. However, each base station is assigned a specific PN offset that is different from those of neighboring base stations. The PN sequences used by the base stations are thus time-shifts of each other, with the amount of shift being much larger than the intracell multipath delay spread. For IS-95 and IS-2000, the PN offsets or shifts are in integer multiples of 64 PN chips. The PN sequence $\{s_k^i\}$ assigned to base station i may be expressed as:

$$S_k^i = S_{k+N_i}, \qquad \text{Eq (1)}$$

where $\{S_k\}$ denotes the PN sequence with no shift;
$\{S_{k+N_i}\}$ denotes the same PN sequence shifted by $N_i$ PN chips; and
$N_i$ is the amount of shift for the PN sequence for base station i (in integer multiples of 64 PN chips).

Although $\{S_k\}$ and $\{S_{k+N_i}\}$ are different shifts (i.e., 0 and $N_i$) of the same PN sequence, they may be considered as different PN sequences.

When in soft handoff, terminal 120 receives multiple transmissions of the same data symbol stream $\{d_n\}$ from multiple base stations. All base stations transmitting this common data symbol stream to the terminal may be included in a set I. Each of the base stations in set I sends a respective transmit chip stream $\{x_k^i\}$, which may be expressed as:

$$x_k^i = (p_k W_k^p + d_k W_k^i + \epsilon_k^i) s_{k+N_i}, \text{ for } i \in I, \qquad \text{Eq (2)}$$

where $\{p_k\}$ represents the pilot symbols;
$\{W_k^p\}$ represents the orthogonal sequence for the pilot channel, which is a sequence of all ones for IS-95 and IS-2000;
$\{d_k\}$ represents the common stream of data symbols sent to the terminal by all base stations in set I;
$\{W_k^i\}$ represents the orthogonal sequence for the code channel used by base station i to transmit the data symbol stream to the terminal;
$\{\epsilon_k^i\}$ represents the symbols for all other code channels transmitted by base station i on the forward link; and
$\{s_{k+N_i}\}$ represents the PN sequence assigned to base station i.

Equation (2) may also be rewritten as:

$$x_k^i = \tilde{p}_k^i + (d_k W_k^i + \epsilon_k^i) s_{k+N_i}, \text{ for } i \in I, \qquad \text{Eq (3)}$$

where $\tilde{p}_k^i$ represents the "processed" pilot symbols for base station i and may be expressed as:

$$\tilde{p}_k^i = p_k W_k^p s_{k+N_i}, \text{ for } i \in I. \qquad \text{Eq (4)}$$

As used herein, a stream may be finite and include a particular number of symbols or samples, or may be continual and include an unspecified number of symbols or samples.

It should be noted that the "desired" signal components $\{d_k\}$ in the transmit chip streams sent by the base stations in set I are not related by shifts of each other. This is because the data symbol stream $\{d_k\}$ may be channelized by a different orthogonal code and is further spectrally spread with a different PN sequence by each of the base stations in set I.

Each base station transmits a respective stream of transmit chips $\{x_k^i\}$ to the terminals within its coverage area. For each base station, each transmit chip $x_k^i$ in the stream is processed by transmitter unit 218 prior to transmission over the wireless channel. The result of all of the processing by transmitter unit 218 is that each transmit chip $x_k^i$ is effectively represented by an instance of a transmit shaping pulse $u_i(t)$ in the modulated signal, with the pulse instance being scaled by the complex value of that transmit chip. Each transmit chip $x_k^i$ is thus sent using the shaping pulse $u_i(t)$ through a linear wireless channel having an impulse response of $c_i(t)$. Each transmit chip is further corrupted by the channel's additive noise, which is often assumed to be white Gaussian noise (AWGN) having a flat power spectral density of $N_o$ Watts/Hz.

At the terminal, the modulated signals transmitted by the base stations in set I are received, conditioned, and provided to the ADC. All of the signal conditioning at the terminal prior to the ADC may be lumped into a receiver impulse response of $r(t)$. The signal at the input to the ADC may then be expressed as:

$$y(t) \sum_{i \in I} \sum_k x_k^i \cdot h_i(t - kT_c) + n(t), \qquad \text{Eq (5)}$$

where $n(t)$ is the total noise observed at the ADC input; and $h_i(t)$ is the overall system impulse response for base station i.

In equation (5) the second or right summation is for the convolution between the transmit chips $\{x_k^i\}$ and the overall system impulse response $h_i(t)$. The first or left summation is for the multiple signals transmitted by the base stations in set I.

The overall system impulse response $h_i(t)$ for base station i may be expressed as:

$$h_i(t) = u_i(n) * c_i(t) * r(t), \qquad \text{Eq (6)}$$

where "*" denotes the convolution. The overall system impulse response $h_i(t)$ thus includes the responses of the transmit pulse, the wireless channel, and the signal conditioning by the terminal.

The transmit chip stream $\{x_k^i\}$ for each base station is assumed to have a zero mean and to be independent and identically distributed (iid). Moreover, at least a portion of the transmit chip stream for each base station is known a priori by the terminal. The known portion typically corresponds to the pilot symbols.

The ADC digitizes the conditioned signal to provide received samples at a sample rate of $1/T_s$, where $T_s$ is the duration of one received sample. The received samples may be expressed as:

$$y(mT_s) = \sum_{i \in I} \sum_k x_k^i \cdot h_i(mT_s - kT_c) + n(mT_s). \qquad \text{Eq (7a)}$$

In general, the sample rate for the ADC may be any arbitrary rate and does not need to be synchronous with the chip rate. Typically, the sample rate is selected to be higher than the chip rate to avoid aliasing of the signal spectrum. For simplicity, the following analysis assumes that the sample rate is chosen to be equal to the chip rate, i.e., $1/T_s=1/T_c$. Moreover, for simplicity, the terminal timing is assumed to be synchronized to the timing of the base stations, and the index k is also used for the received samples at the terminal. However, the analysis described below may be extended for any arbitrary sample rate with slightly more complicated notation and derivations.

For a sample rate of $1/T_c$, the received samples in equation (7a) may be expressed as:

$$y(kT_c) = \sum_{i \in I} \sum_m x^i_{m-k} \cdot h_i(mT_c) + n(kT_c), \quad \text{Eq (7b)}$$

which may be rewritten as:

$$y_k = \sum_{i \in I} x^i_k * h^i_k + n_k, \quad \text{Eq (7c)}$$

where $\{h_k^i\}$ represents the sampled overall system impulse response for base station i, with $h_k^i = h_i(kT_c)$;
$\{n_k\}$ represents the interference from other base stations not in set I and thermal noise, with $n_k = n(kT_c)$; and
$\{y_k\}$ represents the stream of received samples, with $y_k = y(kT_c)$.

The equations shown above are based on certain assumptions regarding the communication channel. Other types of noise and other types of channel may be more accurately represented by other equations.

The equalizer/receiver includes an equalizer filter for each of the base stations in set I. Each equalizer filter performs equalization or filtering of the stream of received samples and provides estimates of the transmit chips sent by the associated base station. The output from each equalizer filter may be expressed as:

$$\{\hat{x}_k^i\} = \{f_k^i\} * \{y_k\}, \text{ for } \in I, \quad \text{Eq (8)}$$

where $\{k^i\}$ represents the impulse response of the equalizer filter for base station i; and
$\{\hat{x}_k^i\}$ represents a stream of transmit chip estimates for base station i.

In general, the equalizer filter may be operated at any sample rate to provide transmit chip estimates at the chip rate. The sample rate may be greater than the chip rate, in which case the taps within the equalizer filter will be fractionally spaced. Moreover, the sample rate does not need to be synchronous with the chip rate. The equalizer filter can thus also perform conversion from sample timing m to chip timing k. The equalizer filter may also include any number of causal taps (i.e., taps to the right of a cursor tap) and any number of anti-causal taps (i.e., taps to the left of the cursor tap).

The impulse response of each equalizer filter may be obtained in various manners. The filter impulse response may be determined based on a particular optimality criterion and using transmit chip estimates, pilot symbol estimates, or data symbol estimates. An exemplary scheme for "training" or "adapting" the equalizer filter is described below. The cursor tap is the tap corresponding to a received sample designated as corresponding to the current chip period.

For this exemplary equalizer training scheme, the impulse response of each equalizer filter is selected to minimize the mean square error between the known processed pilot symbols $\{\tilde{p}_k^i\}$ and the transmit chip estimates $\{\hat{x}_k^i\}$ for the associated base station. This minimum mean square error (MMSE) criterion may be expressed as:

$$\text{minimize } E\{|\tilde{p}_k^i - \hat{x}_k^i|^2\}, \quad \text{Eq (9)}$$

where E denotes the expectation operation. The processed pilot symbols $\{\tilde{p}_k^i\}$ may be obtained as shown in equation (4), and the transmit chip estimates $\{\hat{x}_k^i\}$ may be obtained as shown in equation (8).

For IS-95 and IS-2000, the pilot symbols for all base stations are the same and known a priori by the terminal and the orthogonal sequence $\{W_k^p\}$ for the pilot channel is a sequence of all ones. However, the pilot symbols transmitted by each base station are spectrally spread with a different PN sequence $\{s_{k+N_i}\}$ that is assigned to the base station. The processed pilot symbols for each of the base stations in set I are thus unique to the individual base station.

In training equalizer filter i based on the pilot symbols transmitted on the pilot channel by base station i, the other code channels transmitted by this base station and represented by both $\{d_k W_k^i\}$ and $\{\epsilon_k^i\}$ in equation (2) are regarded as interference. Moreover, by training equalizer filter i for base station i in this manner, the transmissions from all other base stations are also considered as interference.

The minimization in equation (9) may be achieved using various algorithms such as (1) least-squares adaptive algorithms, an example of which is the recursive least squares (RLS) algorithm, and (2) stochastic gradient algorithms, an example of which is the least mean square (LMS) algorithm. The LMS algorithm is described below.

Other training schemes may also be implemented for the equalizer filter, and this is within the scope of the invention. Moreover, other optimality criteria besides MMSE may also be used, and this is within the scope of the invention.

Each equalizer filter provides the transmit chip estimates $\{\hat{x}_k^i\}$ for the associated base station, as shown in equation (8). Estimates of the data symbols, $\{\hat{d}_k^i\}$, for each base station may be obtained based on the transmit chip estimates $\{\hat{x}_k^i\}$, as follows:

$$\hat{d}_k^i = W_k^i \cdot s^*_{k+N_i} \cdot \hat{x}_k^i, \text{ for } i \in I. \quad \text{Eq (10)}$$

In equation (10), the transmit chip estimates $\{\hat{x}_k^i\}$ for base station i are first despread with a complex despreading sequence $\{s_{k+N_i}^*\}$, which is the complex conjugated of the PN sequence $\{S_{k+N_i}\}$ used by this base station. The despread symbols are then multiplied with the orthogonal sequence $\{W_k^i\}$ (for the code channel used by base station i to transmit data to the terminal) to obtain the data symbol estimates $\{\hat{d}_k^i\}$. Although not shown in equation (10), the data symbol estimates $\{\hat{d}_k^i\}$ may further be accumulated over the length of the orthogonal sequence $\{W_k^i\}$ to provide the data symbol estimates $\{\hat{d}_n^i\}$ for base station i. The "channelization" by the terminal (i.e., the multiplication with $\{W_k^i\}$ and the accumulation over the length of the orthogonal sequence) effectively recovers the desired data on the designated code channel and removes the interference from all other code channels.

The data symbol estimates $\{\hat{d}_k^i\}$ from all base stations in set I may be scaled and then combined to obtain the combined data symbol estimates $\{\hat{d}_k\}$, which may be expressed as:

$$\hat{d}_k = \sum_{i \in I} \alpha_k^i \cdot W_k^i \cdot s_{k+N_i}^* \cdot \hat{x}_k^i = \sum_{i \in I} \alpha_k^i \cdot \hat{d}_k^i, \qquad \text{Eq (11)}$$

where $\alpha_k^i$ is the scaling factor to use for base station i for the k-th chip period. The derivation of the scaling factors for the base stations in set I is described below.

The combined data symbol estimates $\{\hat{d}_k\}$ obtained as shown in equation (11) may not be unbiased estimates of the data symbols $\{d_k\}$ transmitted to the terminal. This would be the case if the scaling factors for the base stations in set I are not properly selected to ensure that the symbol estimates are unbiased. Bias in the data symbol estimates may result in performance degradation in subsequent processing stages. For example, the slicing of the combined data symbol estimates to obtain hard decisions and the computation of log-likelihood ratios (LLRs) for these symbol estimates, which may be used by a Turbo decoder, are both affected by any bias in the symbol estimates.

Unbiased combined data symbol estimates may be obtained by scaling the combined data symbol estimates for all base stations, as follows:

$$\hat{d}_k = \alpha_b \cdot \sum_{i \in I} \alpha_k^i \cdot \hat{d}_k^i, \qquad \text{Eq (12)}$$

where $\alpha_b$ is a scaling factor selected to remove bias in the combined data symbol estimates $\{\hat{d}_k\}$. The scaling factor $\alpha_b$ may be determined as described in U.S. patent application Ser. No. 09/924,342, entitled "System and Techniques for Measuring the Performance of a Communication System," filed Aug. 6, 2001, assigned to the assignee of the present application and incorporated herein by reference.

Pilot symbol estimates $\{\hat{p}_k^i\}$ for each of the base stations in set I may be obtained in similar manner as that described above for the data symbols. The pilot symbol estimates for all base stations in set I may then be scaled and combined to obtain the combined pilot symbol estimates $\{\hat{p}_k\}$, which may be expressed as:

$$\hat{p}_k = \sum_{i \in I} \alpha_k^i \cdot W_k^p \cdot s_{k+N_i}^* \cdot \hat{x}_k^i. \qquad \text{Eq (13)}$$

As noted above, each of the base stations in set I is associated with a respective scaling factor $\alpha_k^i$. The set of scaling factors $\{\alpha_k^i\}$ for all base stations in set I may be obtained in various manners, some of which are described below. In general, the scaling factors $\{\alpha_k^i\}$ are selected based on the received SINRs for the data transmitted by the base stations in set I. Assuming similar pilot to traffic ratio among the base stations in set I, the combination of the symbol estimates for all base stations may be in proportion to the received SINRs for the pilot.

In a first embodiment, the scaling factors are selected to minimize the mean square error between the transmitted pilot symbols $\{p_k\}$ and the combined pilot symbol estimates $\{\hat{p}_k\}$ This minimization criterion may be expressed as:

$$\text{minimize } E\{|p_k - \hat{p}_k|^2\}, \qquad \text{Eq (14)}$$

where the combined pilot symbol estimates $\{\hat{p}_k\}$ may be obtained as shown in equation (13). An LMS or RLS filter may be used to derive the scaling factors for the base stations in set I based on the combined pilot symbol estimates $\{\hat{p}_k\}$ and the known pilot symbols $\{p_k\}$, as described below.

In a second embodiment, the scaling factors for all base stations in set I are selected to be equal (i.e., $\alpha_k^1 = \alpha_k^2 = \ldots = \alpha_k^Q$). This results in the data symbol estimates for each of the base stations in set I being given equal weight, and is also referred to as equal gain combining.

Figure 4A:
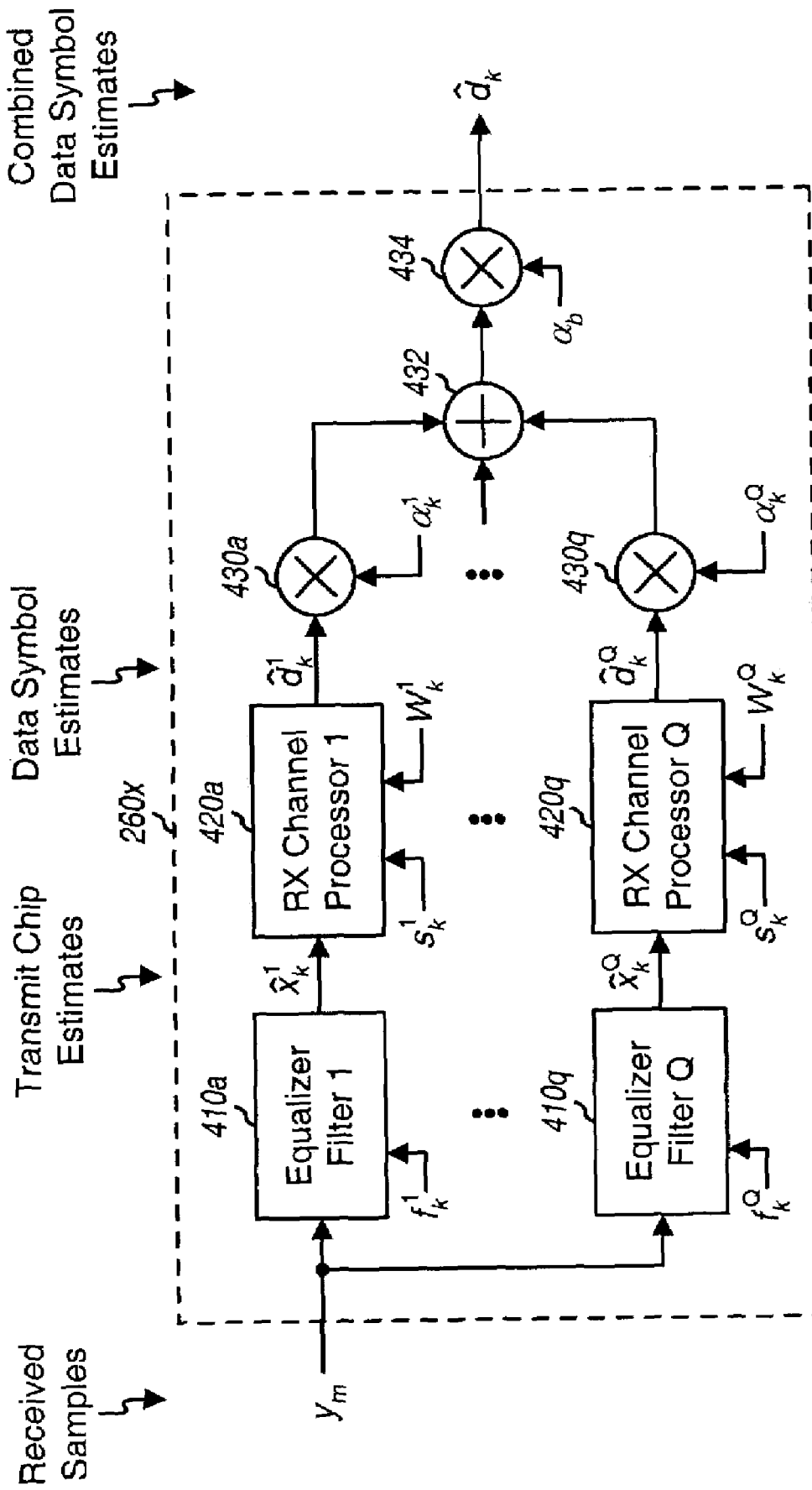
FIGS. 4A and 4B show block diagrams of an equalizer/receiver at the terminal and configured to derive data symbol estimates and pilot symbol estimates, respectively.

FIG. 4A shows a block diagram of an equalizer/receiver 260x, which is an embodiment of equalizer/receiver 260 in FIG. 2 and is configured to derive data symbol estimates. The received samples $\{y_m\}$ are provided to a bank of equalizer filters 410a through 410q, each of which may be assigned to a different one of the base stations in set I. Equalizer/receiver 260x is shown as including Q equalizer filters 410, where Q may be any integer greater than one.

Each equalizer filter 410 equalizes or filters the received samples $\{y_m\}$ in accordance with an associated set of coefficients $f_k^i$ to provide transmit chip estimates $\{\hat{x}_k^i\}$ for the associated base station. The coefficients $f_k^i$ define the impulse response $\{f_k^i\}$ of the equalizer filter. As noted above, the sample rate may be the same or different from the chip rate, and may or may not be synchronized with the chip rate. The transmit chip estimates $\{\hat{x}_k^i\}$ from each equalizer filter 410 are provided to a respective RX channel processor 420, which performs despreading with the despreading sequence $\{s_{k+N_i}^*\}$ and multiplication with the orthogonal sequence $\{W_k^i\}$ for the associated base station, as described below. Each RX channel processor 420 provides data symbol estimates $\{\hat{d}_k^i\}$ for the associated base station.

The data symbol estimates $\{\hat{d}_k^i\}$ from RX channel processors 420a through 420q are provided to multipliers 430a through 430q, respectively. Each multiplier 430 scales its data symbol estimates $\{\hat{d}_k^i\}$ with a respective scaling factor $\alpha_k^i$. The outputs from multipliers 430a through 430q are then combined by a summer 432, and the output of summer 432 is further scaled by a multiplier 434 with the scaling factor $\alpha_b$ to provide the unbiased combined data symbol estimates $\{\hat{d}_k\}$.

Figure 4B:
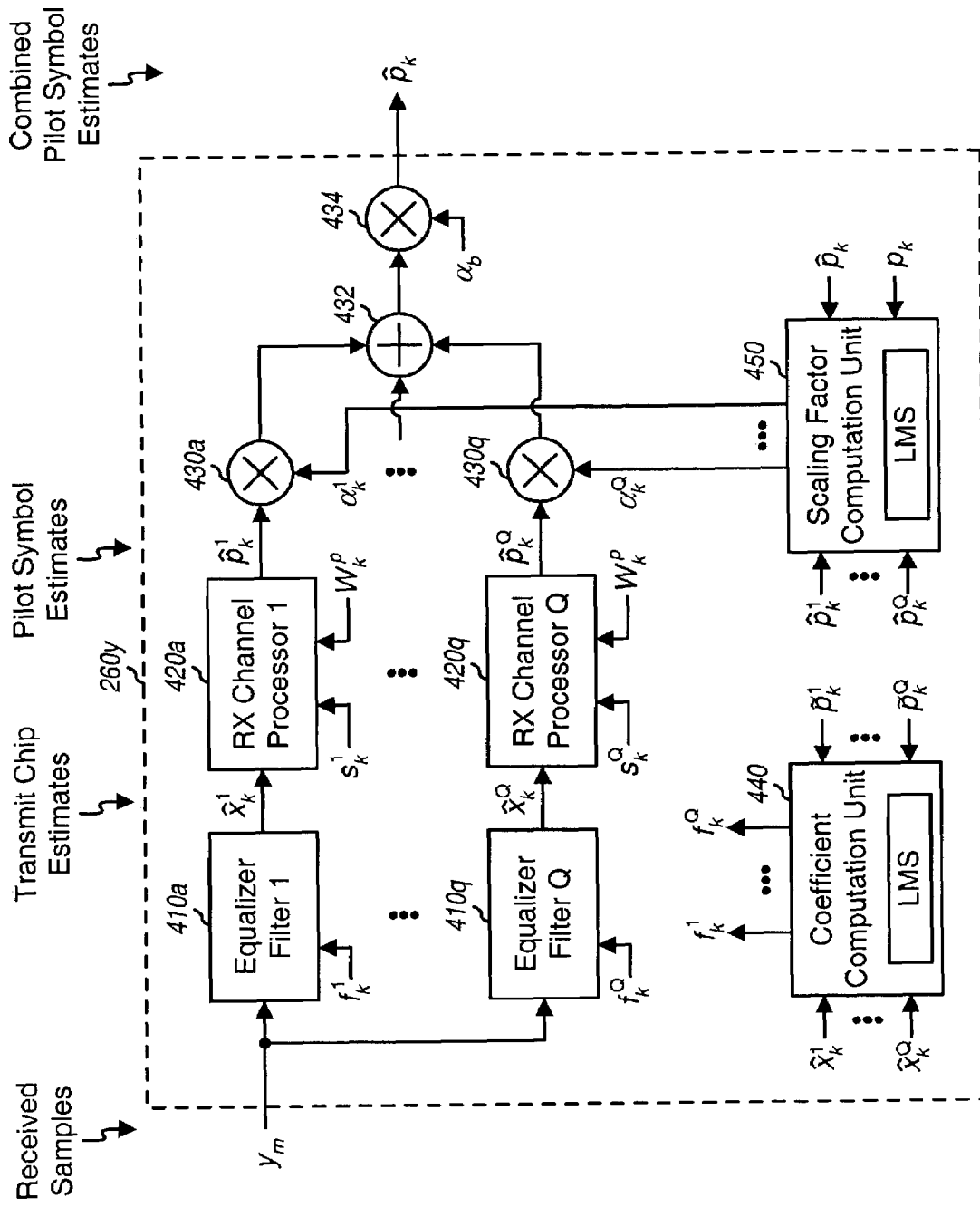

FIG. 4B shows a block diagram of an equalizer/receiver 260y, which is similar to equalizer/receiver 260x in FIG. 4A but is configured to derive pilot symbol estimates. To obtain pilot symbol estimates, each RX channel processor 420 performs despreading with the despreading sequence $\{s_{k+N_i}\}$ for the associated base station and multiplication with the orthogonal sequence $\{W_k^p\}$ for the pilot channel. Each RX channel processor 420 provides pilot symbol estimates $\{\hat{p}_k^i\}$ for the associated base station. The pilot symbol estimates $\{\hat{p}_k^i\}$ from RX channel processors 420a through 420q are then scaled by multipliers 430a through 430q, respectively, with scaling factors $\alpha_k^1$ through $\alpha_k^Q$, respectively. The scaled pilot symbol estimates are then combined by summer 432, and further scaled by multiplier 434 to provide the combined pilot symbol estimates $\{\hat{p}_k\}$.

As shown in FIG. 4B, a coefficient computation unit 440 derives a set of coefficients $f_k^i$ for each of the base stations in set I. A scaling factor computation unit 450 derives the scaling factor $\alpha_k^i$ for each of the base stations in set I. Units 440 and 450 are described in further detail below.

Figure 4C:
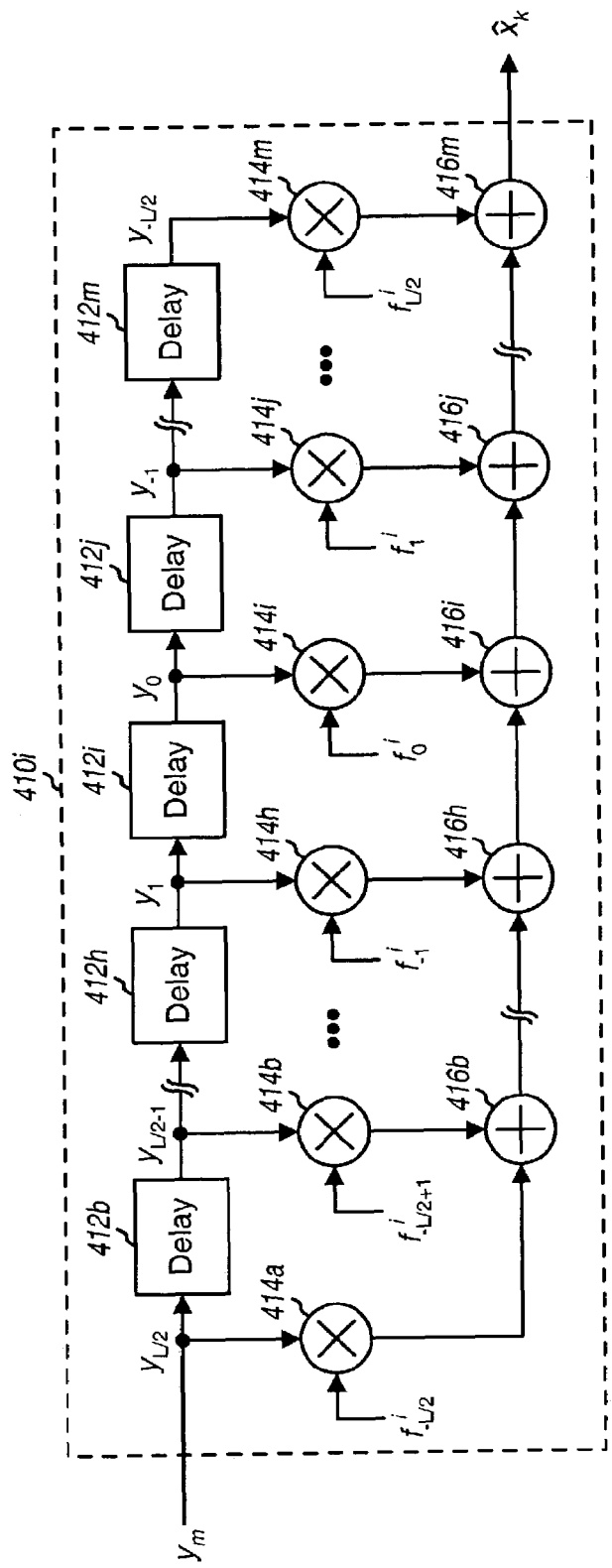
FIG. 4C shows a block diagram of a FIR filter for an equalizer filter within the equalizer/receiver.

FIG. 4C shows a block diagram of a finite impulse response (FIR) filter 410i, which may be used for each of equalizer filters 410a through 410q in FIGS. 4A and 4B. FIR filter 410i includes L+1 taps, with each tap corresponding to a received sample for a particular sample period. Each tap is further associated with a respective coefficient provided by coefficient computation unit 440.

As shown in FIG. 4C, the received samples $\{y_m\}$ are provided to L delay elements 412b through 412m. Each delay element provides one sample period ($T_s$) of delay. As noted above, the sample rate is typically selected to be higher than the chip rate to avoid aliasing of the signal spectrum. However, it is also desirable to select a sample rate that is as close to the chip rate as possible so that fewer number of filter taps are required to cover a given delay spread in the overall system impulse response $h_t(t)$. Fewer taps would simplify the designs of the FIR filter and the coefficient computation unit. In general, the sample rate may be selected based on the characteristics of the system in which the equalizer/receiver will be used.

For each chip period k, the received samples for the L+1 taps are provided to multipliers 414a through 414m. Each multiplier is provided with a respective received sample $y_j$ and a respective filter coefficient $f_j^i$, where j denotes the tap index and $j \in \{-L/2 \ldots -1, 0, 1, \ldots L/2\}$. Each multiplier 414 then multiplies its received sample $y_{-j}$ with its coefficient $f_j^i$ to provide a corresponding scaled sample. The L+1 scaled samples from multipliers 414a through 414m are then summed by adders 416b through 416m to provide a transmit chip estimate $\hat{x}_k^i$ for the k-th chip period.

The transmit chip estimate $\hat{x}_k^i$ may be computed as shown in equation (6), which may also be expressed as:

$$\hat{x}_k^i = \sum_{j=-L/2}^{L/2} f_j^i \cdot y_{k,-j}, \qquad \text{Eq (15)}$$

where $y_{k,-L/2}$ through $y_{k,L/2}$ in equation (15) are the L+1 received samples within the FIR filter, which are used for the computation of the transmit chip estimate $\hat{x}_k^i$ for the k-th chip period. The equalizer filter thus also performs conversion from sample rate denoted by the index m to chip rate denoted by the index k.

For simplicity, the equalizer filter is described as being implemented with a FIR filter. For the FIR filter, the filter impulse response $\{f_k^i\}$ is equal to the set of filter coefficients $f_k^i$. Other types of digital filter, such as an infinite impulse response (IIR) filter, may also be used, and this is within the scope of the invention.

Figure 4D:
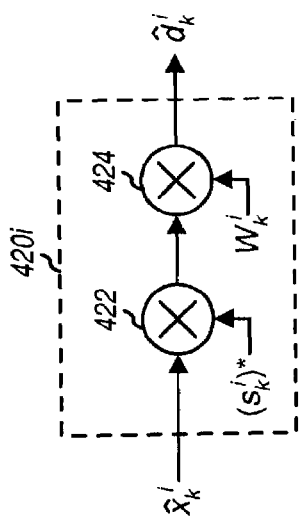
FIG. 4D shows a block diagram of an RX channel processor within the equalizer/receiver.

FIG. 4D shows a block diagram of an embodiment of an RX channel processor 420i, which may be used for each of RX channel processors 420a through 420q in FIGS. 4A and 4B. Within RX channel processor 420i, the transmit chip estimates $\{\hat{x}_k^i\}$ for base station i are provided to a complex multiplier 422 and multiplied with the despreading sequence (denoted as $(s_k^i)^*$) for the base station. The despread symbols are then provided to a multiplier 424 and multiplied with the orthogonal sequence $\{W_k^i\}$ (for the code channel used by base station i to transmit data to the terminal) to provide the data symbol estimates $\{\hat{d}_k^i\}$ for base station i.

RX channel processor 420i may also be operated to provide pilot symbol estimates $\{\hat{p}_k^i\}$ for base station i. This may be achieved by multiplying the despread symbols with the orthogonal sequence $\{W_k^p\}$ used for the pilot channel (instead of $\{W_k^i\}$). The orthogonal sequences $\{W_k^p\}$ and $\{W_k^i\}$ may have the same or different lengths, and the pilot symbol rate and may be the same or different from the data symbol rate.

Equalizer Filter Coefficient Computation

Coefficient computation unit 440 derives the set of coefficients $f_k^i$ for each of the base stations in set I based on one of the equalizer training schemes described above. In an embodiment that is described below, coefficient computation unit 440 derives the set of coefficients $f_k^i$ for each base station based on the transmit chip estimates $\{\hat{x}_k^i\}$ for that base station. The error between the known processed pilot symbols $\{\tilde{p}_k^i\}$ and the transmit chip estimates $\{\hat{x}_k^i\}$ for base station i may be expressed as:

$$e_k^i = \tilde{p}_k^i - \hat{x}_k^i, \qquad \text{Eq (16)}$$

where $\{\tilde{p}_k^i\}$ may be obtained as shown in equation (4) and $\{\hat{x}_k^i\}$ may be obtained as shown in equation (8) or (15).

If the LMS algorithm is used for training, then the updated coefficients $f_{k+1}^i$ for the equalizer filter for base station i may be computed as:

$$f_{k+1}^i = f_k^i + \underline{y}_k \cdot \mu \cdot (e_k^i)^*, \qquad \text{Eq (17)}$$

where $\underline{y}_k$ is a vector of L+1 received samples ($y_{-L/2}$ through $y_{L/2}$) in the equalizer filter for the k-th chip period;

$f_k^i$ is the set of L+1 coefficients ($f_{-L/2}^i$ through $f_{L/2}^i$) used for the equalizer filter for the k-th chip period; and μ is a unit-less adaptation constant for the coefficient computation.

Other adaptive algorithms (e.g., the RLS and other variants of the LMS) may also be used to train the equalizer filter. Moreover, since each pilot symbol $p_n$ spans multiple chip periods and each transmit chip $x_k$ may span one or multiple received sample periods, the filter coefficients may be updated at the sample rate, chip rate, or symbol rate.

Scaling Factor Computation

Scaling factor computation unit 450 derives the set of scaling factors $\{\alpha_k^i\}$ for the base stations in set I using one of the schemes described above. In an embodiment that is described below, scaling factor computation unit 450 derives the scaling factors $\{\alpha_k^i\}$ based on the combined pilot symbol estimates $\{\hat{p}_k\}$. The error between the known pilot symbols $\{p_k\}$ and the combined pilot symbol estimates $\{\hat{p}_k\}$ may be expressed as:

$$e_k = p_k - \hat{p}_k, \qquad \text{Eq (18)}$$

where $\{\hat{p}_k\}$ may be obtained as shown in equation (13).

If the LMS algorithm is used, then the updated scaling factors may be computed as:

$$\alpha_{k+1}^i = \alpha_k^i \mu_\alpha \cdot \hat{p}_k^i \cdot e_k^*, \text{ for } i \in I, \qquad \text{Eq (19)}$$

where $\mu_\alpha$ is a unit-less adaptation constant for the scaling factor computation.

For clarity, the derivation of the equalizer filter coefficients and the scaling factors have been described specifically for the LMS algorithm. Other adaptation algorithms may also be used to derive the coefficients and scaling factors, and this is within the scope of the invention. For example, a direct matrix inversion (DMI) algorithm may be used to compute the equalizer filter coefficients and/or the scaling factors. The LMS, RLS, DMI, and other adaptation algorithms are described in further detail by Simon Haykin in a book entitled "Adaptive Filter Theory", 3rd edition, Prentice Hall, 1996, which is incorporated herein by reference.

The equalizer/receiver described above may be implemented in various manners. For clarity, FIGS. 4A and 4B show one equalizer filter 410, one RX channel processor 420, and one multiplier 430 being provided for each of the base stations in set I. This implementation may be used for systems operating at very high data rates.

In an alternative implementation, the multiple equalizers are implemented with a single hardware unit in a time division multiplexed (TDM) manner. This hardware unit may include one equalizer filter 410, one RX channel processor 420, and one multiplier 430. The hardware unit is operated at a sufficiently high speed such that it can perform processing for all base stations in set I, one base station at a time. For example, the hardware unit may be operated for $N_c$ clock cycles to perform equalization for base station 1, then for $N_c$ clock cycles to perform equalization for base station 2, and so on, then for $N_c$ clock cycles to perform equalization for base station Q, then for $N_c$ clock cycles to perform equalization for base station 1, and so on.

Figure 5:
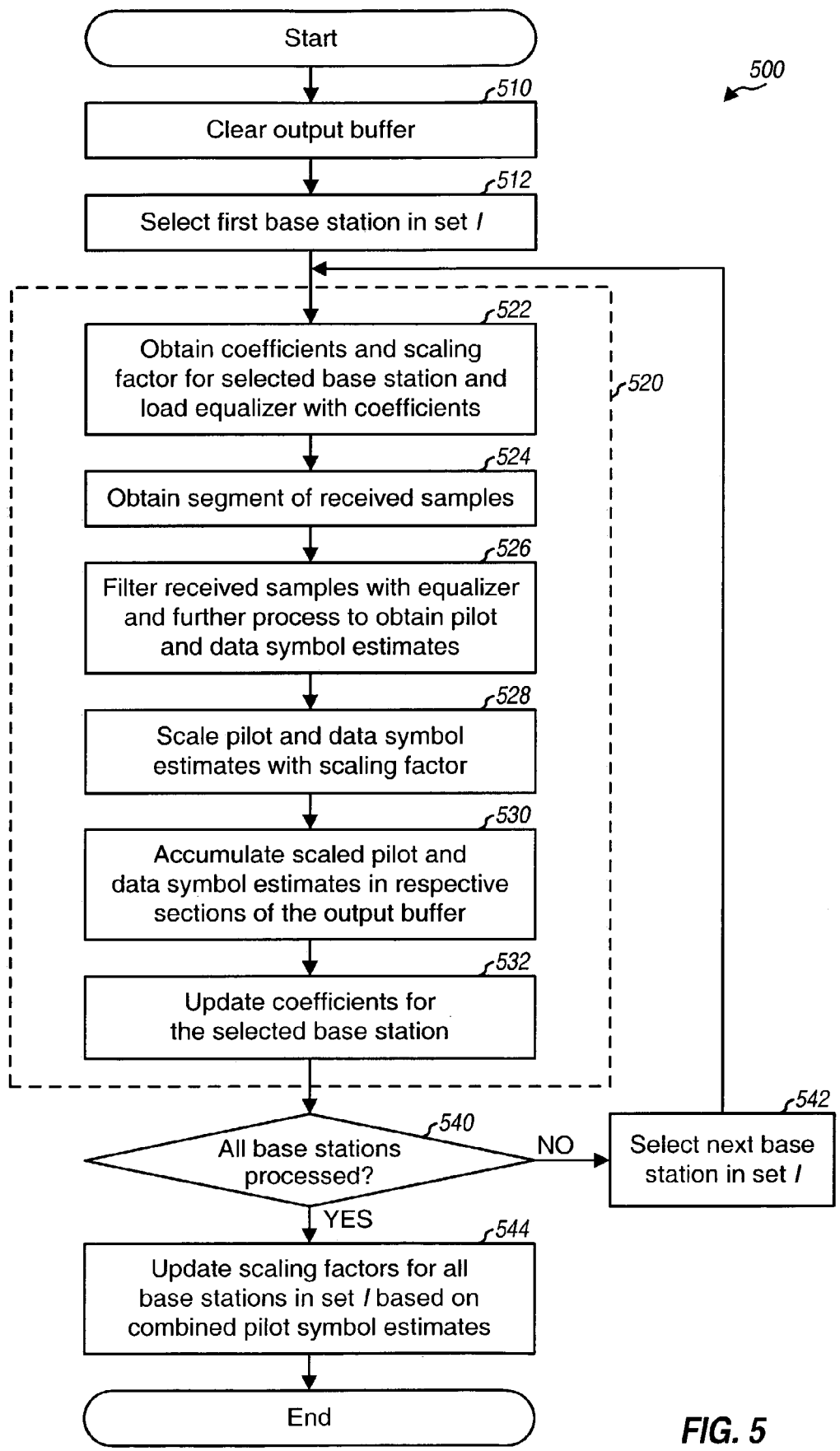
FIG. 5 shows a flow diagram of an exemplary process performed by a single hardware unit to implement multiple equalizers in a TDM manner.

FIG. 5 shows a flow diagram of an exemplary process 500 performed by a hardware unit to implement multiple equalizers in a TDM manner. Process 500 is for one cycle through all base stations in set I. Initially, at the start of the cycle, an output buffer used to store intermediate results is cleared (step 512). The first base station in set I is then selected for processing (step 514).

The processing for the selected base station is shown within block 520. The set of coefficients $\underline{f}_k^i$ and the scaling factor $\alpha_k^i$ for the selected base stations are first obtained from storage, and an equalizer within the hardware unit is loaded with the coefficients (step 522). A segment of received samples is next obtained from an input buffer (step 524), where the size of the segment may be selected based on various considerations (e.g., the desired update rate for the coefficients and scaling factors, processing delays, and so on). The received samples in the segment are then filtered with the coefficients to obtain transmit chip estimates $\{\hat{x}_k^i\}$, which are further processed with the despreading sequence $(s_k^i)^*$ and the orthogonal sequences $\{W_k^p\}$ and $\{W_k^i\}$ to obtain pilot symbol estimates $\{\hat{p}_k^i\}$ and data symbol estimates $\{\hat{d}_k^i\}$, respectively (step 526). The pilot and data symbol estimates are further scaled by the scaling factor $\alpha_k^i$ (step 528), and the scaled pilot and data symbol estimates are accumulated in their respective sections of the output buffer (step 530). The coefficients for the selected base station are updated based on the transmit chip estimates (step 532).

If all base stations in set I have not been processed (as determined in step 540), then the next base station in set I is selected (step 542) and the process returns to step 522 to perform the processing for this base station. Otherwise, the scaling factors for all base stations in set I are updated based on the combined pilot symbol estimates $\{\hat{p}_k\}$ retrieved from the output buffer (step 544). The combined data symbol estimates $\{\hat{d}_k\}$ in the output buffer may further be processed to obtained decoded data. Process 500 may be repeated for the next cycle through the base stations in set I.

The single hardware unit design allows one set of processing units to be reused multiple times to perform the processing for all base stations in set I, thereby effectively implementing multiple "virtual" parallel equalizers for these base stations. This design can greatly reduce the complexity of the equalizer/receiver. Moreover, this design may be easily implemented and with lower cost since the equalizer, RX channel processor, and adaptive algorithm for each base station have the same structure and easily lend themselves to being reused.

The implementation of multiple virtual parallel equalizers is described in further detail in U.S. patent application Ser. No. 10/226,031, entitled "Communication Receiver with Virtual Parallel Equalizers," filed Aug. 21, 2002, assigned to the assignee of the present application and incorporated herein by reference.

For clarity, the equalization techniques have been described above for a terminal with a single antenna. These techniques may be extended for a terminal with multiple antennas. In this case, multiple equalizers may be provided for the multiple antennas (e.g., one equalizer for each antenna). The equalizers may be operated to perform training for one base station at a time. The result of the training for base station i is a set of coefficients $\underline{f}_k^{l,i}$ and a scaling factor $\{\alpha_k^{l,i}\}$ for each of the multiple antennas for base station i (where l is the index for antenna). After all base stations in set I have been trained, a set of scaling factors $\{\alpha_k^i\}$ may be obtained for use to combine the symbols estimates for all base stations. The symbol combining may thus be performed across multiple antennas for each base station, and then across all base stations in set I. The equalizer would then operate as a space-time filter. The multiple equalizers for the multiple antennas may also be implemented as virtual equalizers as described above.

The equalization techniques described herein may be implemented by various means. For example, these techniques may be implemented in hardware, software, or a combination thereof. For a hardware implementation, the elements used for equalization (e.g., one or more equalizer filters, coefficient computation unit, scaling factor computation unit, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the equalization techniques may be implemented with modules (e.g., procedures, functions, and so on) that perform the functions described herein. The software codes may be stored in a memory unit (e.g., memory unit 272 in FIG. 2) and executed by a processor (e.g., controller 270). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus in a wireless communication system, comprising:
an equalizer comprising a single filter operative to filter a stream of samples with a plurality of sets of coefficients to provide a plurality of streams of transmit chip estimates during a cycle time, wherein the stream of samples includes a plurality of signals transmitted from a plurality of transmission sources, and wherein each set of coefficients of the plurality of sets of coefficients is for a respective one of the plurality of transmission sources and is used to provide a corresponding stream of transmit chip estimates of the plurality of transmit chip estimates, wherein the single filter is time division multiplexed to filter the stream of samples with one set of coefficients of the plurality of sets of coefficients at a time during the cycle time, and wherein the single filter is operated at a speed such that the single filter processes signals associated with at least two transmission sources of the plurality of transmission sources during the cycle time;
at least one channel processor operative to process the plurality of streams of transmit chip estimates to provide a plurality of streams of data symbol estimates, one stream of data symbol estimates for each of the plurality of transmission sources; and
a combiner operative to combine the plurality of streams of data symbol estimates to provide a stream of combined data symbol estimates.

2. The apparatus of claim 1, further comprising:
a coefficient computation unit operative to update said each of the plurality of sets of coefficients based on the corresponding stream of transmit chip estimates.

3. The apparatus of claim 2, wherein said each of the plurality of sets of coefficients is further updated based on processed pilot symbols transmitted by an associated transmission source.

4. The apparatus of claim 2, wherein the coefficient computation unit is operative to update said each of the plurality of sets of coefficients based on a least mean square (LMS) algorithm.

5. The apparatus of claim 2, wherein the coefficient computation unit is operative to update said each of the plurality of sets of coefficients based on a recursive least squares (RLS) algorithm.

6. The apparatus of claim 1, wherein the at least one channel processor is operative to
despread each of the plurality of streams of transmit chip estimates with a respective one of a plurality of despreading sequences to provide a corresponding one of a plurality of streams of despread symbols, and
process each of the plurality of streams of despread symbols with a particular channelization sequence to provide a corresponding one of the plurality of streams of data symbol estimates.

7. The apparatus of claim 1, further comprising:
at least one multiplier operative to scale the plurality of streams of data symbol estimates with a plurality of scaling factors to obtain a plurality of streams of scaled data symbol estimates, and wherein the combiner is operative to combine the plurality of streams of scaled data symbol estimates to provide the stream of combined data symbol estimates.

8. The apparatus of claim 7, further comprising:
a scaling factor computation unit operative to update the plurality of scaling factors.

9. The apparatus of claim 8, wherein the at least one channel processor is operative to process the plurality of streams of transmit chip estimates to provide a plurality of streams of pilot symbol estimates for the plurality of transmission sources, wherein the combiner is operative to combine the plurality of streams of pilot symbol estimates to provide a stream of combined pilot symbol estimates, and wherein the scaling factor computation unit is operative to update the plurality of scaling factors based on the stream of combined pilot symbol estimates.

10. The apparatus of claim 8, wherein the scaling factor computation unit is operative to update the plurality of scaling factors based on a least mean square (LMS) algorithm.

11. The apparatus of claim 8, wherein the scaling factor computation unit is operative to update the plurality of scaling factors based on a recursive least squares (RLS) algorithm.

12. The apparatus of claim 1, wherein the single filter is implemented as a finite impulse response (FIR) filter.

13. The apparatus of claim 1, wherein the plurality of transmission sources are base stations in a CDMA communication system.

14. An apparatus in a wireless communication system, comprising:
a filter operative to filter a stream of samples with a first set of coefficients to provide a first stream of transmit chip estimates during a cycle time, wherein the stream of samples includes a plurality of signals transmitted from a plurality of transmission sources, and wherein the first set of coefficients is for a first transmission source selected from among the plurality of transmission sources; and
a channel processor operative to process the first stream of transmit chip estimates to provide a first stream of data symbol estimates during the cycle time;
wherein the filter and channel processor are time division multiplexed (TDM) to filter and process the stream of samples with a second set of coefficients for a second transmission source selected from among the plurality of transmission sources to provide a second stream of data symbol estimates during the cycle time, wherein the first and second streams of data symbol estimates are combined to provide a stream of combined data symbol estimates, and wherein the filter and the channel processor process signals associated with the first and second transmission sources to perform processing for the first and second transmission sources one transmission source at a time during the cycle time.

15. The apparatus of claim 14, further comprising:
a multiplier operative to scale the first stream of data symbol estimates with a first scaling factor for the first transmission source to obtain a first stream of scaled data symbol estimates, and
wherein the multiplier is further operated in a TDM manner to scale the second stream of data symbol estimates with a second scaling factor for the second transmission source to obtain a second stream of scaled data symbol estimates, and wherein the first and second streams of scaled data symbol estimates are combined to provide the stream of combined data symbol estimates.

16. A method of processing a plurality of signals transmitted from a plurality of transmission sources in a wireless communication system, the method comprising:
filtering a stream of samples with a plurality of sets of coefficients to provide a plurality of streams of transmit chip estimates during a cycle time, wherein the stream of samples includes the plurality of signals, and wherein each set of coefficients of the plurality of sets of coefficients is for a respective one of the plurality of transmission sources and is used to provide a corresponding stream of transmit chip estimates;

processing the plurality of streams of transmit chip estimates to provide a plurality of streams of data symbol estimates, one stream of data symbol estimates of the plurality of streams of data symbol estimates for each of the plurality of transmission sources; and combining the plurality of streams of data symbol estimates to provide a stream of combined data symbol estimates;

wherein the step of filtering is performed by a single filter operated at speed such that the single filter processes signals associated with at least two transmission sources of the plurality of transmission sources during the cycle time, the single filter being time division multiplexed to filter the stream of samples with one set of coefficients of the plurality of sets of coefficients at a time during the cycle time.

17. The method of claim 16, further comprising:
updating said each set of coefficients of the plurality of sets of coefficients based on the corresponding stream of transmit chip estimates.

18. The method of claim 17, wherein the updating said each set of coefficients includes
obtaining a stream of processed pilot symbols transmitted by an associated transmission source, and
updating the set of coefficients based on the stream of processed pilot symbols and the associated stream of transmit chip estimates.

19. The method of claim 17, wherein said each set of coefficients of the plurality of sets of coefficients is updated based on a least mean square (LMS) algorithm or a recursive least squares (RLS) algorithm.

20. The method of claim 16, wherein the processing for each of the plurality of streams of transmit chip estimates includes
despreading the stream of transmit chip estimates with a despreading sequence to provide a stream of despread symbols, and
processing the stream of despread symbols with a particular orthogonal sequence to provide the corresponding stream of data symbols.

21. The method of claim 16, further comprising:
scaling the plurality of streams of data symbol estimates with a plurality of scaling factors to obtain a plurality of streams of scaled data symbol estimates, and wherein the plurality of streams of scaled data symbol estimates are combined to provide the stream of combined data symbol estimates.

22. The method of claim 21, further comprising:
updating the plurality of scaling factors based on a particular criterion.

23. The method of claim 22, wherein the updating the plurality of scaling factors includes
processing the plurality of streams of transmit chip estimates to provide a plurality of streams of pilot symbol estimates,
combining the plurality of streams of pilot symbol estimates to provide a stream of combined pilot symbol estimates, and
updating the plurality of scaling factors based on the stream of combined pilot symbol estimates.

24. The method of claim 21, wherein the plurality of scaling factors are set to the same value.

25. An article of manufacture comprising:
a computer readable medium, the computer readable medium being communicatively coupled to a digital signal processing device (DSPD) capable of interpreting digital information, the computer readable medium storing instructions that, when executed by the DSPD, cause the DSPD to perform operations comprising:

filtering a stream of samples with a plurality of sets of coefficients to provide a plurality of streams of transmit chip estimates during a cycle time, wherein the stream of samples includes a plurality of signals transmitted from a plurality of transmission sources, and wherein each set of coefficients of the plurality of sets of coefficients is for a respective one of the plurality of transmission sources and is used to provide a corresponding stream of transmit chip estimates;

processing the plurality of streams of transmit chip estimates to provide a plurality of streams of data symbol estimates, one stream of data symbol estimates of the plurality of streams of data symbol estimates for each of the plurality of transmission sources; and combining the plurality of streams of data symbol estimates to provide a stream of combined data symbol estimates;

wherein the operation of filtering is performed by a single filter operated at speed such that the single filter processes signals associated with at least two transmission sources of the plurality of transmission sources during the cycle time, the single filter being time division multiplexed to filter the stream of samples with one set of coefficients of the plurality of sets of coefficients at a time during the cycle time.

26. An apparatus in a wireless communication system, comprising:
means for filtering a stream of samples with a plurality of sets of coefficients to provide a plurality of streams of transmit chip estimates during a cycle time, wherein the stream of samples includes a plurality of signals transmitted from a plurality of transmission sources, and wherein each set of coefficients of the plurality of sets of coefficients is for a respective one of the plurality of transmission sources and is used to provide a corresponding stream of transmit chip estimates of the plurality of transmit chip estimates, wherein the means for filtering comprises means for time division multiplexing a single filter to filter the stream of samples with one set of coefficients of the plurality of sets of coefficients at a time during the cycle time, wherein the time division multiplexing means further operates the single filter at a speed such that the single filter processes signals associated with at least two transmission sources of the plurality of transmission sources during the cycle time;

means for processing the plurality of streams of transmit chip estimates to provide a plurality of streams of data symbol estimates, one stream of data symbol estimates for each of the plurality of transmission sources; and means for combining the plurality of streams of data symbol estimates to provide a stream of combined data symbol estimates.

27. The apparatus of claim 26, further comprising:
means for updating said each set of coefficients of the plurality of sets of coefficients based on the corresponding stream of transmit chip estimates.

28. The apparatus of claim 26, further comprising:

means for scaling the plurality of streams of data symbol estimates with a plurality of scaling factors to obtain a plurality of streams of scaled data symbol estimates, and wherein the plurality of streams of scaled data symbol estimates are combined to provide the stream of combined data symbol estimates.

29. The apparatus of claim 28, further comprising:

means for updating the plurality of scaling factors.

30. An article of manufacture comprising:

a computer readable medium storing executable instructions, the instructions comprising:

code for filtering a stream of samples with a plurality of sets of coefficients to provide a plurality of streams of transmit chip estimates during a cycle time, wherein the stream of samples includes a plurality of signals transmitted from a plurality of transmission sources in a wireless communication system, and wherein each set of coefficients of the plurality of sets of coefficients is for a respective one of the plurality of transmission sources and is used to provide a corresponding stream of transmit chip estimates of the plurality of transmit chip estimates;

code for processing the plurality of streams of transmit chip estimates to provide a plurality of streams of data symbol estimates, one stream of data symbol estimates of the plurality of streams of data symbol estimates for each of the plurality of transmission sources; and code for combining the plurality of streams of data symbol estimates to provide a stream of combined data symbol estimates;

wherein the code for filtering comprises code for operating a single filter at a speed such that the single filter processes signals associated with at least two transmission sources from the plurality of transmission sources during the cycle time, the single filter being time division multiplexed to filter the stream of samples with one set of coefficients of the plurality of sets of coefficients at a time during the cycle time.

31. The article of manufacture of claim 30, wherein the instructions further comprise:

code for updating said each set of coefficients of the plurality of sets of coefficients based on the corresponding stream of transmit chip estimates.

32. The article of manufacture of claim 30, wherein the instructions further comprise:

code for scaling the plurality of streams of data symbol estimates with a plurality of scaling factors to obtain a plurality of streams of scaled data symbol estimates, and wherein the plurality of streams of scaled data symbol estimates are combined to provide the stream of combined data symbol estimates.

33. The article of manufacture of claim 32, wherein the instructions further comprise:

code for updating the plurality of scaling factors.

34. The method of claim 16, wherein the steps of filtering, processing, and combining are performed by a terminal in soft handoff from a first transmission source of the plurality of transmission sources to a second transmission source of the plurality of transmission sources.

* * * * *